Dec. 4, 1945.    T. M. RECTOR    2,390,388
METHOD AND APPARATUS FOR SOLVENT EXTRACTION
Filed June 12, 1940    6 Sheets-Sheet 1
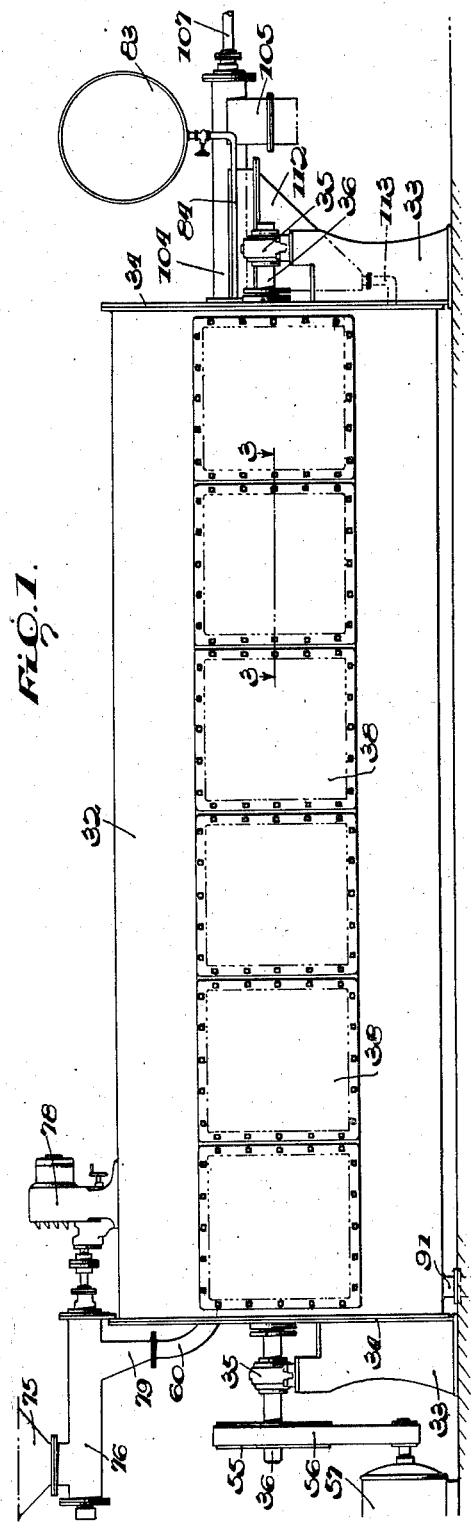
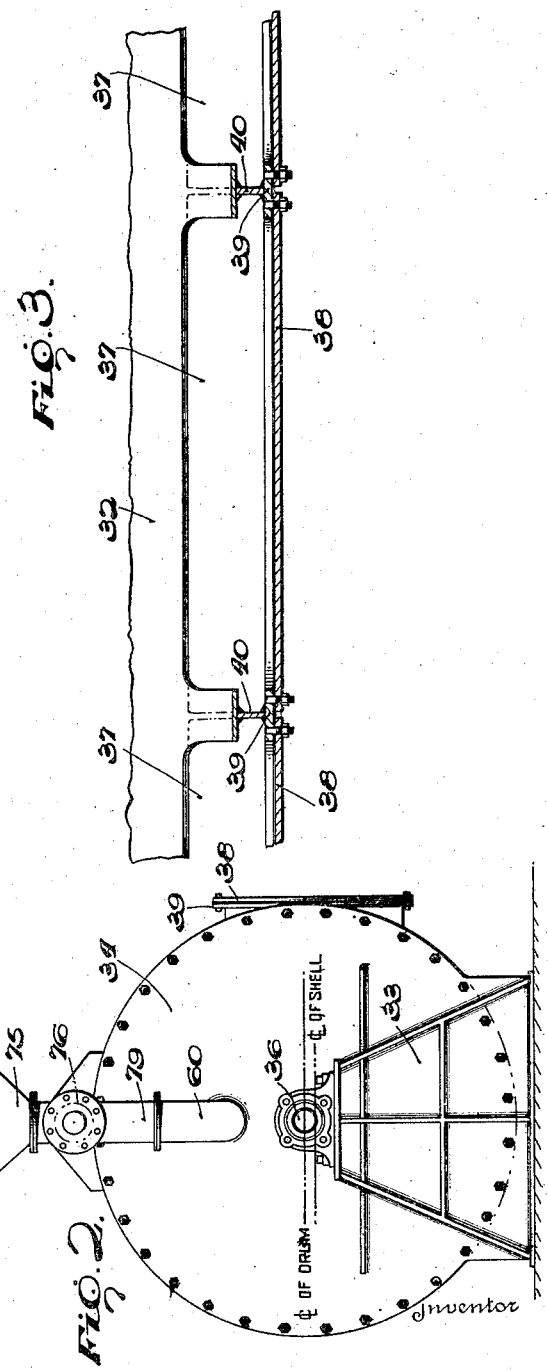
Inventor
Thomas M. Rector
By Cameron, Kerkam & Sutton
Attorneys

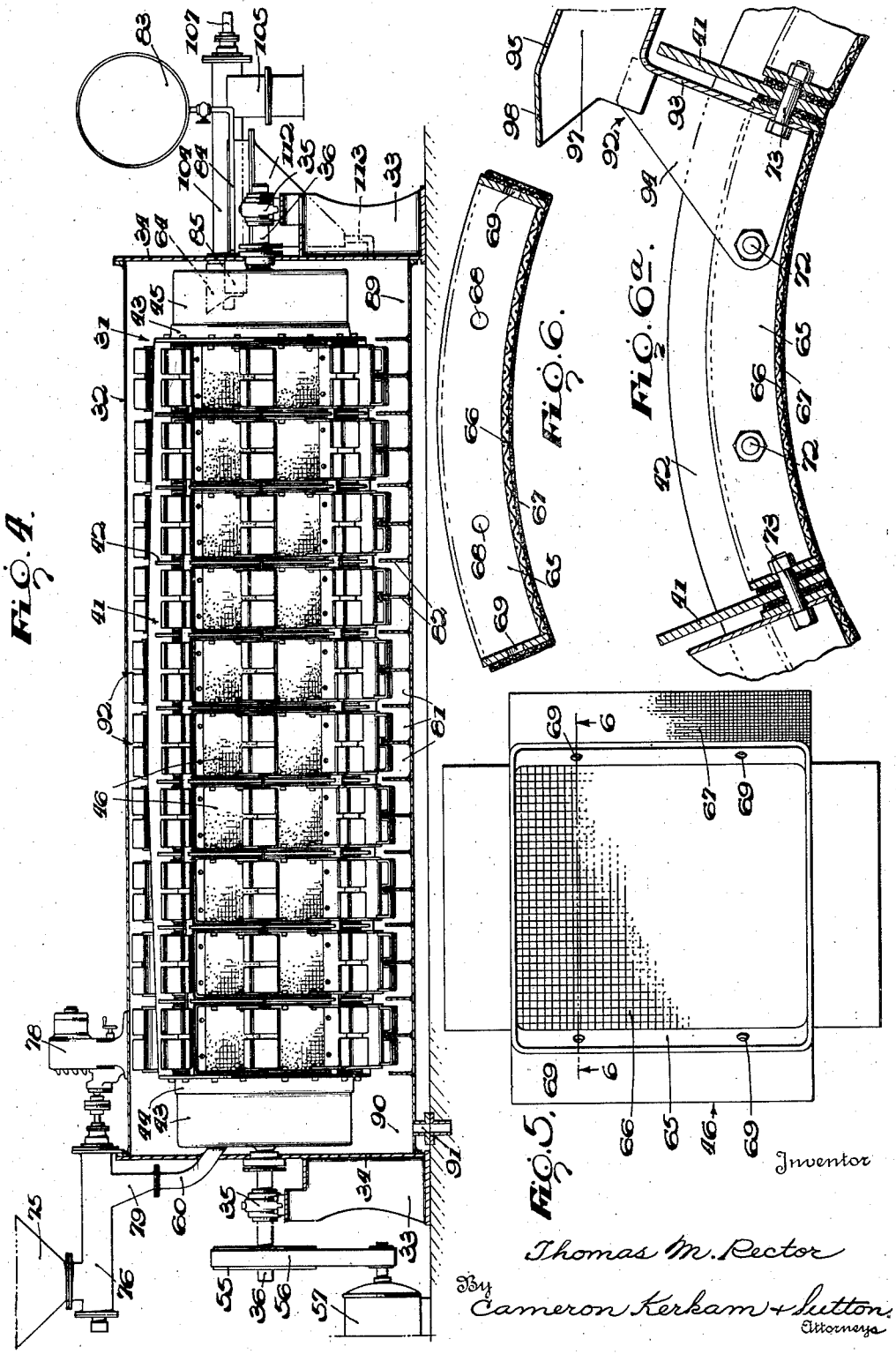

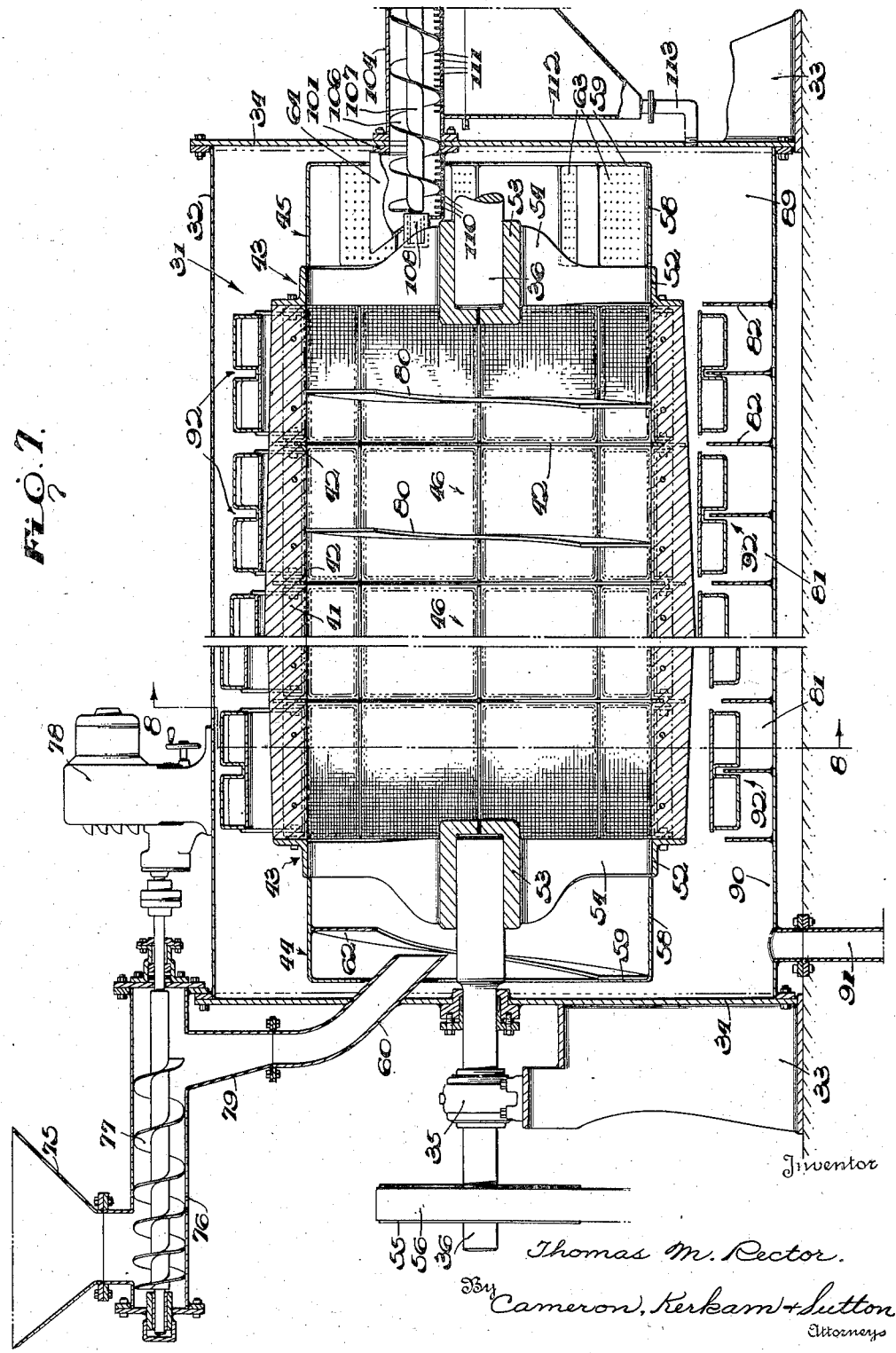

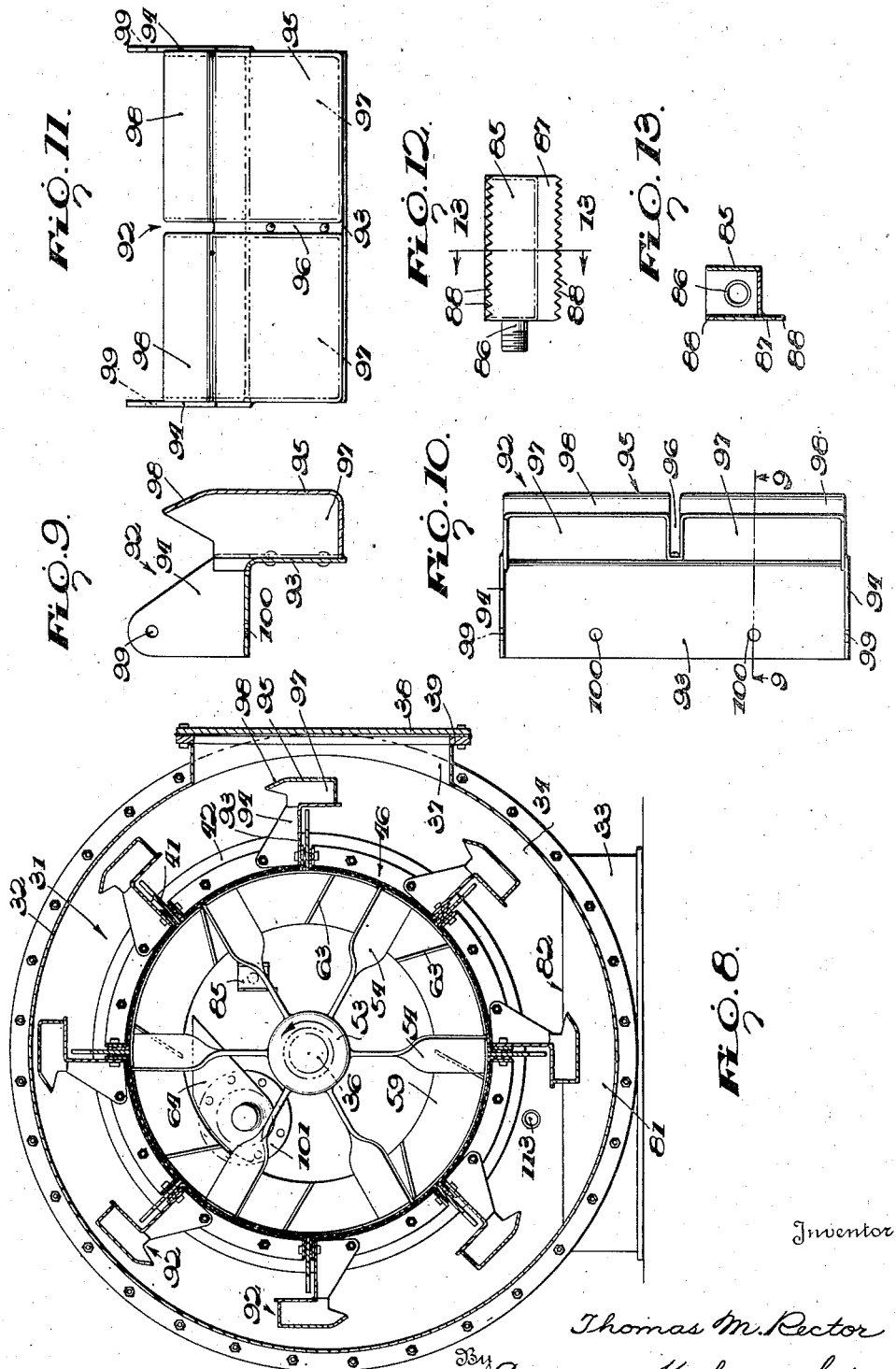

Dec. 4, 1945.            T. M. RECTOR            2,390,388
METHOD AND APPARATUS FOR SOLVENT EXTRACTION
Filed June 12, 1940            6 Sheets-Sheet 5
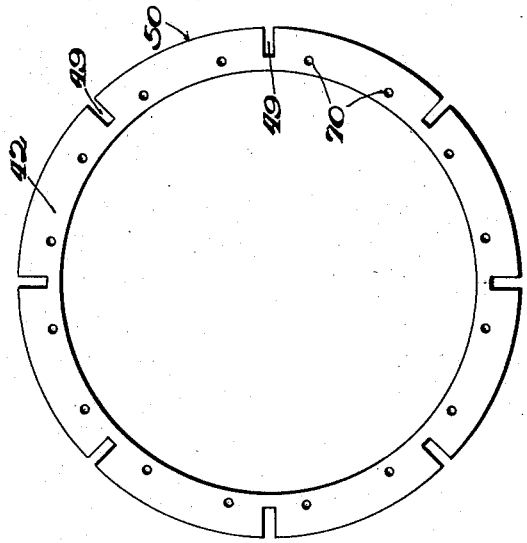
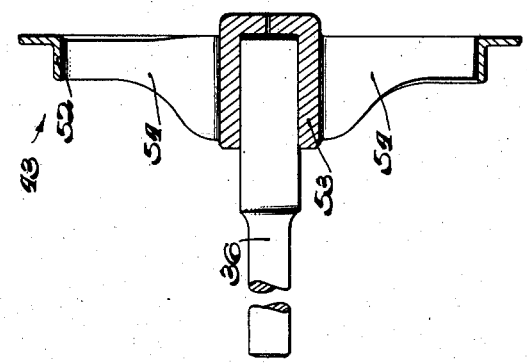
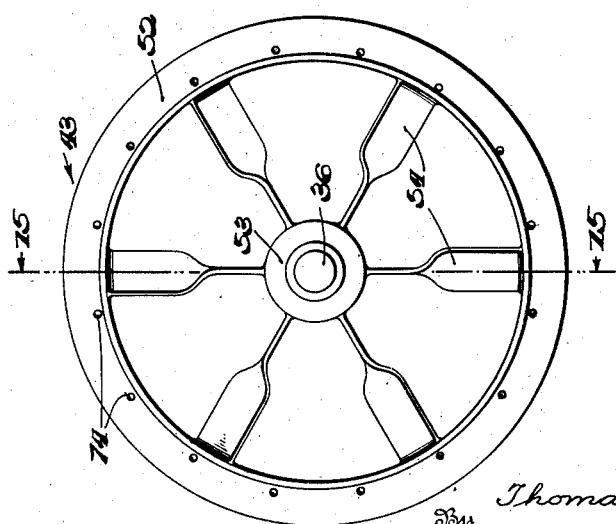
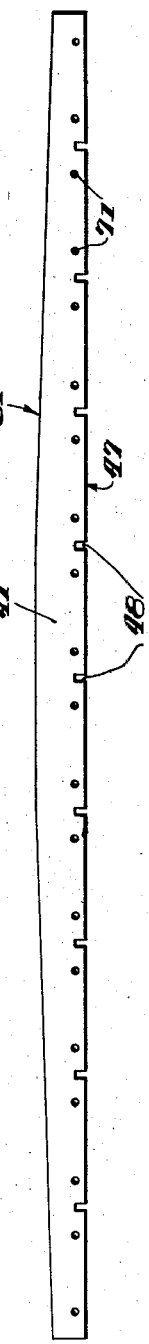
Inventor
Thomas M. Rector
By Cameron, Kerkam + Sutton
Attorneys Dec. 4, 1945.  T. M. RECTOR  2,390,388
METHOD AND APPARATUS FOR SOLVENT EXTRACTION
Filed June 12, 1940  6 Sheets-Sheet 6
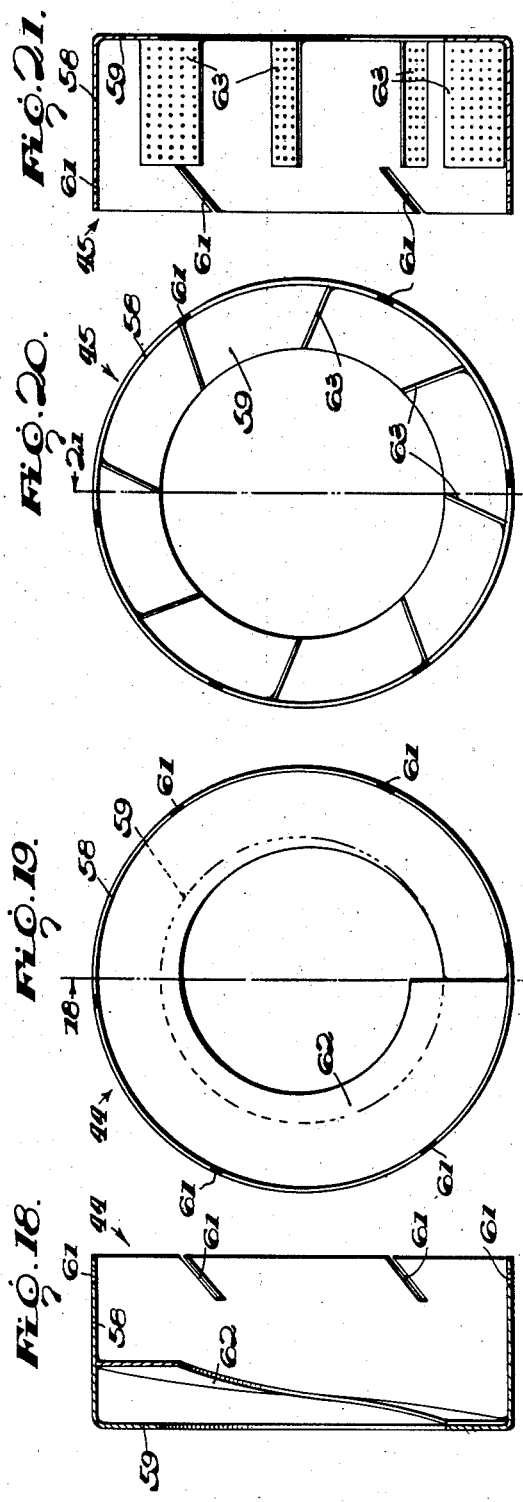
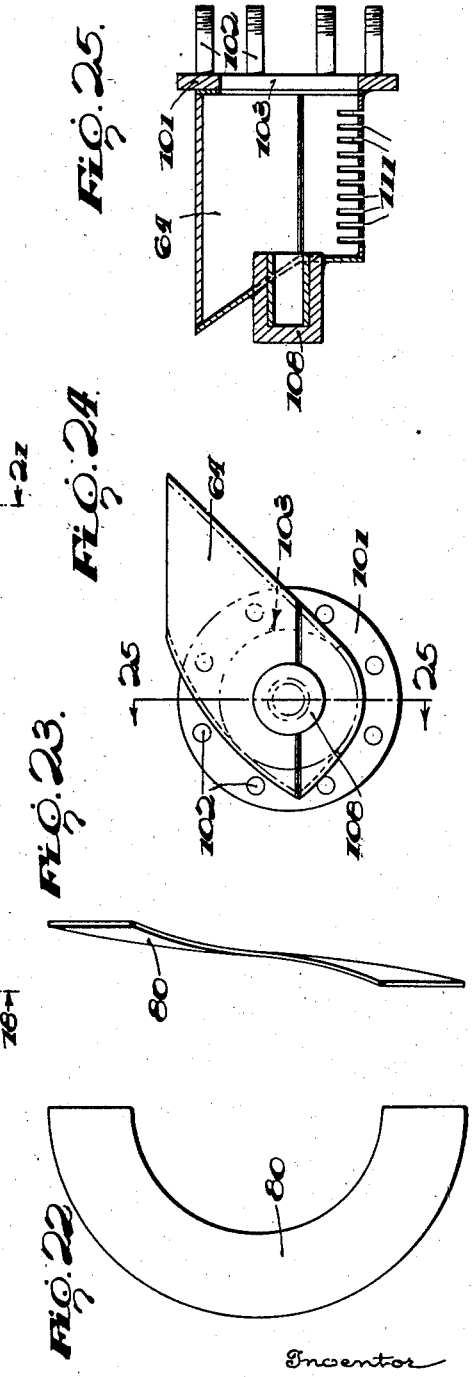
Inventor
Thomas M. Rector
Cameron, Kerkam + Sutton
Attorneys Patented Dec. 4, 1945

2,390,388

UNITED STATES PATENT OFFICE 2,390,388

METHOD AND APPARATUS FOR SOLVENT EXTRACTION

Thomas M. Rector, Morristown, N. J., assignor to General Foods Corporation, New York, N. Y., a corporation of Delaware Application June 12, 1940, Serial No. 340,205

9 Claims. (Cl. 23—270)

This invention relates generally to the art of extracting soluble matter from solid materials containing such matter, and has particular application to methods and apparatus for the solvent extraction of oils and fats from finely divided or flaked vegetable materials, such as corn germ, copra, palm kernels, soya beans, rape seeds, and the like.

For ease in expression, the more specific statements of the present disclosure will refer only to the extraction of oil from oil bearing vegetable material, although it is to be expressly understood that the invention is equally applicable to the extraction of various other substances, solid as well as liquid, from a wide variety of materials, including those of the mineral and animal kingdoms.

One of the immediate objects of the present invention is to provide a novel procedure and apparatus of greater efficiency than those heretofore known for extracting oil from vegetable materials which have been mechanical treated so as to free the oil from the natural cell structure.

Another object is to provide an extractor of the character described embodying the countercurrent principle, but so improved in structure and mode of operation as to be capable of more rapid and efficient extraction than prior devices intended for similar purposes.

A further object is to produce a continuously operative solvent extraction process and apparatus of novel characteristics wherein the solvent flows both countercurrently and transversely to the movement of the solid material while the latter is continuously agitated, thereby subjecting each particle of the material to frequent contact with, and relatively vigorous washing by, solvent of varying concentration.

Still another object is to provide an extraction device of the character described embodying a rotatable, screen type drum through which the extractable material is continuously moved and means for producing a continuous flow of solvent both countercurrently and transversely to the movement of said material through the drum, the transverse circulation of the solvent not only increasing the rapidity of the extraction but also preventing clogging of the drum screen.

These and other objects, including that of generally improving upon the structural and performance characteristics of the device heretofore available to the art for similar extraction procedures, will appear more fully upon a consideration of the detailed description of the embodiment of the invention which follows. Although only one particular form of machine embodying the invention is described and illustrated in the accompanying drawings, it is to be expressly understood that these drawings are for the purpose of illustration only and are not to be construed as defining the scope of the invention, reference being had for the latter purpose to the appended claims.

In the drawings, wherein like reference characters indicate like parts throughout the several views:

Fig. 1 is a side elevation of one form of extraction apparatus embodying the procedural and structural features of the present invention;

Fig. 2 is an end elevation of the extractor shown in Fig. 1, looking from the left in the latter figure but omitting the motor, belt and pulley of the drum rotating mechanism;

Fig. 3 is a fragmentary horizontal sectional view taken substantially on line 3—3 of Fig. 1, but on an enlarged scale, showing the manner in which the detachable cover plates are secured to the shell or casing of the extractor;

Fig. 4 is a side elevation of the extractor of Fig. 1 with the shell shown in section in order to illustrate the exterior of the rotatable extractor drum and the arrangement of the transverse partitions or weirs which divide the bottom portion of the shell into a plurality of solvent compartments;

Fig. 5 is a plan view of one of the removable screen units which make up the cylindrical wall of the extractor drum, showing the fine mesh working screen with its edge portions in the extended, unlapped positions which they occupy before the screen unit is inserted in its proper position in, and secured to, the framework of the drum;

Fig. 6 is a sectional view of one of the screen units taken substantially on line 6—6 of Fig. 5, but showing the working screen with its edge portions doubled and lapped upwardly around the sides of the screen frame;

Fig. 6a is a fragmentary, enlarged sectional view taken on a vertical plane perpendicular to the axis of the drum illustrating the manner in which the screen units and solvent transfer buckets are secured to the framework of the drum;

Fig. 7 is an enlarged, vertical sectional view taken approximately on the axis of the extractor of Fig. 1, but with the central portion of the extractor broken away, certain parts shown in full and others omitted in the interest of clarity;

Fig. 8 is a transverse vertical section taken substantially on line 8—8 of Fig. 7, looking toward the material discharge end of the extractor and, as in the case of the left-hand portion of Fig. 7, omitting for the sake of greater clarity the semicircular helical vanes within the drum which serve to feed the material axially through the drum;

Figs. 9, 10 and 11 are sectional, plan and side elevational views, respectively, of one of the solvent transfer bucket units which serve to deliver solvent from the compartments in the bottom of the shell to the upper surface of the rotatable drum, whence it passes into the drum through the perforations of the screen units. the section of Fig. 9 being taken substantially on line 9—9 of Fig. 10;

Figs. 12 and 13 are a side elevation and a transverse vertical section, respectively, of the solvent supply weir from which the fresh solvent is initially delivered to the interior of the drum, the section of Fig. 13 being taken substantially on line 13—13 of Fig. 12;

Figs. 14 and 15 are an end elevation and a vertical axial section, respectively, of one of the two end rings or wheels of the drum, including the associated stub shaft by which the drum is supported and rotated, the stub shaft and spokes of the wheel being shown in full in Fig. 15, rather than in section, said section being otherwise taken substantially on line 15—15 of Fig. 14;

Figs. 16 and 17 are elevational views of one of the longitudinal rib members and one of the circumferential hoop members, respectively, which make up the skeleton framework of the drum;

Figs. 18 and 19 are a vertical axial section and an end elevation, respectively, of the member forming the head of the drum at the end into which the solid material is initially fed, the section of Fig. 18 being taken substantially on line 18—18 of Fig. 19;

Figs. 20 and 21 are an end elevation and a vertical axial section, respectively, of the drum head which is secured to the material discharge end of the drum, the section of Fig. 21 being taken substantially on line 21—21 of Fig. 20;

Figs. 22 and 23 are side and end elevations, respectively, of one of the semicircular, helical material feeding vanes of the drum; and Figs. 24 and 25 are an end elevation and a vertical axial section, respectively, of the material discharge trough into which the solid extracted material is delivered by the blades of the discharge head of the drum and from which said material is removed by the screw conveyor indicated in Fig. 7, the section of Fig. 25 being taken substantially on line 25—25 of Fig. 24.

The extraction apparatus illustrated in the drawings as one embodiment of the present invention primarily comprises an extractor drum having a foraminous peripheral wall rotatably mounted in a shell or casing the bottom of which is formed into a plurality of intercommunicating solvent compartments through which the solvent and dissolved matter gradually flow in a direction countercurrent to that in which the solid extractable material moves through the interior of the drum, the drum being provided with a plurality of bucket-like members secured to its periphery at spaced points both axially and circumferentially thereof which take solvent from the compartments at the bottom of the shell, elevate it, and then pour it over the exterior surface of the drum, whence it passes into the drum through the perforations of the foraminous wall, flows through the particles of solid material in a direction substantially transverse to the axial direction of movement thereof through the drum, and then drains back into the compartments through the perforations of the lower portion of the drum wall. Novel means are also provided for feeding the solid material into the drum, moving it through the drum with a combined axial and rolling or tumbling movement and removing it from the discharge end thereof, as well as for supplying fresh solvent to the extractor and causing a controlled countercurrent flow thereof through the compartments beneath the drum. With this general concept of the combined transverse and countercurrent flow extractor of the present invention in mind, reference may now be had to the drawings for a more detailed disclosure of the various novel features thereof.

As can be seen best from Figs. 1, 2, 4, 7 and 8, the drum of the extractor, indicated generally at 31, is an elongated, substantially cylindrical device of built-up construction (the elements of which will be described in detail hereinafter) which is housed and mounted for rotation about a horizontal axis within a generally cylindrical shell or casing 32, the latter being supported in any suitable manner as by standards 33 secured to or formed integrally with the plates 34 forming the end closures of the shell. The standards 33 also support suitable bearings 35 in which are journalled the stub shafts 36 of the drum 31, the positions of these bearings being such as to support the drum with its axis off-set vertically above that of the shell 32 in order that there may be adequate space in the bottom portion of the shell for the solvent compartments later to be described.

The shell 32 is so constructed as to be liquid tight, and may also be normally sealed against the escape of vapor by packing or welding around all of the openings in the end plates 34 through which extend the drum shafts, material feed and discharge conduits, etc. Access to the interior of the shell may be had, however, for purposes of repair, cleaning or the like, through a plurality of manholes 37 extending the entire length of the shell along one side thereof, each manhole being provided with a removable cover plate 38 adapted to be suitably secured to a flanged frame 39 which is in turn welded to webs 40 projecting outwardly from the shell 32 (see Fig. 3).

The drum itself is of novel composite construction, comprising a plurality of longitudinal rib members 41 and circumferential hoop members 42 suitably secured together, as by welding, to form a skeleton framework, a pair of spoked end rings or wheels 43 which carry the stub shafts 36 and may be welded to the ends of the rib members 41, a feeding drum head 44, a discharge drum head 45, and a plurality of arcuate screen units 46 which are detachably secured to the rib and hoop members 41 and 42 to form a perforated cylindrical wall for the drum.

Each of the longitudinal rib members 41 (Fig. 16), of which there are eight in the embodiment illustrated, extends the entire length of the drum between the end rings 43, and is provided in its bottom or radially inner edge 47 with a plurality of equally spaced notches 48 which are adapted to cooperate with similar notches 49 extending radially inwardly from the outer edges 50 of the hoop members 42 (Fig. 17), of which there are nine in the embodiment disclosed, when the rib and hoop members are assembled to form the skeleton of the drum. The notch joints thus formed facilitate maintenance of the rib and hoop members in their proper relative positions while they are being welded together to form the drum framework. The upper or radially outer edge 51 of each of the rib members is preferably divergently inclined from both ends toward the middle, as shown, in order to increase the radial depth of the ribs intermediate the ends thereof and thereby strengthen the drum framework against sagging.

To each end of the framework formed by the rib and hoop members 41 and 42 is secured an end ring or wheel 43 (Figs. 14 and 15) consisting of a rim 52 of L-shaped cross section, a hub 53 and a plurality of twisted spokes 54 interconnecting the rim and hub, and preferably welded thereto. Fixed in the hub 53 of each of the wheels 43, as by a shrinkage fit, is the inner end of one of the stub shafts 36 by which the drum is journalled for rotation in the bearings 35. As is indicated in Fig. 14, the radially inner portion of each of the spokes 54 adjacent the hub 53 is coplanar with the axis of the drum, while the outer portion of each spoke is twisted out of the axial plane at a suitable angle so as to assist in moving the solid material being treated axially through the drum. The two wheels 43 are identical in construction except that, because they are faced in opposite directions, their spokes are likewise twisted oppositely. The stub shaft 36 fixed to the wheel at the feeding end of the drum is also preferably longer than that at the discharge end in order to provide for the connection thereto of a suitable means by which the drum may be rotated. For example, in the construction illustrated, this stub shaft carries a pulley 55 which is driven by a belt 56 from a motor 57, it being understood that the drive thus provided is suitably controllable in order to rotate the drum at any desired speed.

The element 44 (Figs. 18 and 19) which forms the head of the drum at the material feeding end thereof consists of an imperforate cylindrical wall 58 of slightly smaller diameter than the rim 52 of the adjacent end wheel 43, and a lip or flange 59 which extends radially inwardly from the left-hand or outer edge of cylindrical wall 58, the opening defined by the inner edge of said lip being of sufficiently large diameter to admit the discharge end of a fixed delivery chute 60 forming a part of the mechanism, later to be described, by which the solid material to be extracted is fed into the drum. The right-hand or inner edge portion of cylindrical wall 58 is provided with a plurality of diagonally extending slots 61 equal in number to, and of the same angularity as the twisted portions of, the spokes 54 of the adjacent end wheel 43, this construction enabling assembly of the drum head 44 with the rest of the drum by simply telescoping its right-hand or inner edge portion inside of the rim 52 of end wheel 43, the spokes of the wheel seating in the slots 61 and thereby holding the head against rotation relatively to the drum framework. If desired, the head may then be permanently secured to the end wheel, as by welding.

In order to positively feed the material delivered to the drum head 44 by the chute 60 into the main body of the drum, said head is also provided with a helical vane 62 which, as shown best in Fig. 19, may be of a gradually increasing radial height from the outer end thereof, which is adjacent to and of the same height as the lip 59 of the drum head, to its inner end which lies in axial alignment with its outer end and in the same transverse plane as the closed ends of the slots 61. That is, in the illustrated embodiment, the radially inner edge of the vane 62 follows a path which is both helical and spiral, the radial height of said vane at its inner end being substantially the same as that of the hereinafter described semicircular, helical feeding vanes within the main body of the drum.

The drum head 45 (Figs. 20 and 21) which is located at the discharge end of the drum is similar in construction to the feeding head 44 in so far as it includes an imperforate cylindrical wall 58, an inwardly turned lip or flange 59 and diagonal slots 61 for engagement with the spokes 54 of the end wheel 43, although, of course, it is faced oppositely to said feeding head 44. Interiorly, however, the two heads differ, the discharge head 45 being provided with a plurality of flat, perforated lifting blades 63 which are secured to the cylindrical wall 58 and radial lip 59 as by welding, each of these blades lying at an angle to the radial plane through its line of contact with the cylindrical wall 58, but with its inner longitudinal edge parallel to the drum axis and at the same distance therefrom as the inner edge of lip 59. The function of these blades 63 is to lift the extracted solid material from the bottom of the discharge head 45, where it collects after passage through the main body of the drum, and to deliver said material into a fixed discharge trough 64 which extends into the opening defined by the inner edge of the lip 59 of the drum head and forms a part of the mechanism, later to be described, which removes the exhausted solid material from the apparatus after extraction. The perforations in the blades 63, which may be on the order of 1/8" in diameter, are adapted to permit drainage of solvent and dissolved matter from the solid material being elevated by the blades downwardly into the bottom portion of the drum head, whence it may flow into the solvent compartments in the bottom of the shell 32 in a manner to be set forth hereinafter.

Coming now to the removable screen units 46 constituting the cylindrical wall of the drum, eighty of which are required to surface the drum of the disclosed embodiment, it will be seen from Figs. 5, 6 and 6a that each unit consists of a quadrilateral frame 65 having two arcuate sides and two which are straight-edged, a section of relatively coarse mesh supporting screen 66 spot welded along its edges to the frame, and a section of fine mesh working screen 67 which has no permanent connection to the frame 65, but is simply placed under the supporting screen 66 with its edge portions doubled and lapped around the outside of the screen frame. Each of the arcuate sides of the frame 65 is provided with a pair of bolt holes 68, while each of the straight sides has similar holes 69, said bolt holes being so located and spaced as to line up with corresponding holes 70 and 71 formed in the circumferential hoop members 42 and longitudinal rib members 41, respectively (see Figs. 16 and 17). With this construction, after the section of working screen 67 has been folded about the frame 65 in the manner indicated in Fig. 6, the whole unit may be inserted into one of the eighty spaces in the drum framework defined by the rib and hoop members, and then secured in place to the hoop and rib members, respectively, by bolts 72 and 73, which bolts also pass through the doubled and lapped edge portions of the fine mesh working screen 67, as indicated in Fig. 6a. The rims 52 of the end wheels 43 are also provided with bolt holes 74, corresponding to those in the circumferential hoop members 42, in order to receive half of the bolts 72 which pass through the arcuate sides of the screen units in the two end sections of the drum.

Although the cylindrical surface 66 of each screen unit which serves merely to support the fine mesh working screen 67 may be formed in any suitable manner, it has been found that a coarse screen of approximately ½" mesh, spot welded to the frame 65, is quite satisfactory. While the specific character of the working screen 67 may also vary dependent upon the size of the particles of solid matter being treated, a screen of approximately 100 mesh is considered suitable when the apparatus is to be used for the extraction of oil from finely divided or flaked vegetable matter, such as corn germ. A convenient way of making each of the necessary sections of working screen is to first cut a rectangular piece of dimensions exceeding those of the bottom of the screen frame by approximately twice the height of the frame sides, then cut out the corners to produce the cruciform shown in Fig. 5, and finally double over the outwardly extending edge portions of the cruciform and fold them up against the sides of the screen frame, as indicated in Fig. 6.

The mechanism by which the solid material to be extracted is fed into the drum may be of any suitable construction, and may be varied when handling materials of specifically different character. In the embodiment illustrated, the means provided are particularly adapted to handle vegetable material in finely divided or flaked state and comprise a hopper 75 delivering into one end of a horizontal pipe 76 in which is mounted a helicoidal screw conveyor 77 driven by a variable speed motor 78 mounted on top of the extractor shell 32. The pipe 76 is also provided with a downwardly extending spout 79 into which the material is delivered by the conveyor 77 and which connects to the upper end of the previously mentioned chute 60, the lower end of which extends through the end plate 34 of the shell and into the feeding head 44 of the rotating drum 31. The material thus delivered from the chute 60 into the drum head 44 is caused to move into the main body of the drum by the feeding action of the helical vane 62 and the twisted portions of the spokes 54 of the end wheel 43.

Once inside the drum, the material is continuously moved therethrough in a generally axial direction, and at the same time rolled or tumbled, by any suitable means such as an interrupted type helical conveyor of the construction indicated in the right-hand portion of Fig. 7. This conveyor, of which only a portion is shown in the latter figure, comprises a plurality of semicircular helical vane members 80, each of the construction illustrated in Figs. 22 and 23, secured to the interior of the drum at axially spaced points therealong and arranged in staggered relationship in two opposed rows with the leading edge of each vane in substantially the same radial plane with, but axially spaced from, the trailing edges of the immediately adjacent vanes. Two such vane members 80 are located in each of the ten sections of the drum defined by the circumferential hoop members 42 and end wheels 43, and are preferably welded to the inner edges of the longitudinal rib members 41. Inasmuch as it is desirable to maintain the drum less than half full, so as to insure a vigorous rolling or tumbling action of the material as it moves through the drum, the radial height of the vanes 80 may be substantially less than the radius of the drum, as is indicated in Fig. 7.

In order to produce the combined countercurrent and transverse flow of solvent relatively to the movement of the solid material which is one of the features of the present invention, novel means have been provided for establishing a plurality of solvent compartments within the shell adapted to contain solvent of varying concentration, and for delivering solvent from said compartments to the interior of the drum in such a manner that it flows substantially transversely through the material therein and then drains back into said compartments through the screened cylindrical surface of the drum, the compartments being so constructed and arranged that there is a continuous, gradual flow of solvent and dissolved matter in a direction opposite to that in which the material is moved through the drum. Novel means have also been provided for originally supplying the fresh solvent to the extractor, and for returning thereto solvent which may be carried out of the drum in the solid material leaving the discharge end of the latter.

As is shown best in Figs. 4, 7 and 8, the bottom portion of the extractor shell 32 is divided into a plurality of solvent compartments 81 by means of transversely extending, segmental shaped partitions or weirs 82 which may be welded to the shell, the weirs varying uniformly in height from one end of the shell to the other, the tallest weir being positioned in substantially the same vertical plane as rim 52 of the end ring or wheel 43 at the material discharge end of the drum. The weirs 82, of which there are twenty-one in the embodiment illustrated, are uniformly spaced along the length of the drum 31, alternate weirs lying in the same vertical planes with the circumferential hoop members 42 of the drum framework. The difference in height between adjacent weirs is so selected that the overflow from one compartment 81 to another will be such as to produce the desired rate of countercurrent flow of the solvent through the extractor.

If desired, the top edges of the weirs 82 may be provided with rectangular or triangular cutouts at one or more points therealong through which the overflow may be effected, instead of using the entire lengths of said edges for this purpose. Alternatively, the weirs might be made of uniform height throughout the length of the shell and provided with communicating orifices of suitable size and shape to produce the desired gradual flow of solvent from compartment to compartment.

The fresh solvent may be originally introduced into the apparatus from any suitable source 83 through a valved pipe 84 and a solvent supply weir 85 of the novel construction illustrated in Figs. 12 and 13. This supply weir is essentially a channel shaped receptacle or container having an inlet nipple 86 which is adapted to pass through the end plate 34 of the extractor shell and to be suitably coupled to the pipe 84 so as to support the weir in an inwardly extending, horizontal position within the shell, off-set from both the horizontal and the vertical axial planes of the drum as indicated in Figs. 4 and 8. The vertical side wall of the weir which is adapted to serve as the overflow side is provided with a downwardly extending continuation 87, and both the top and the bottom edges of said wall are serrated as indicated at 88 in order to insure a substantially uniform overflow of solvent along the entire length of said wall.

With this construction, fresh solvent from the source 83 may be permitted to flow at a controllable rate through the pipe 84 into the supply weir 85, and thence to overflow the serrated wall, dripping off the points of the bottom edge thereof into the discharge head 45 of the drum. The fresh solvent thus washes down through the solid material which is being elevated by the perforated lifting blades 63 and accumulates in the bottom of the drum head 45, whence it overflows into the adjoining screened section of the drum and then drains through the screen into the first one or two solvent compartments 81 therebeneath.

Although the fresh solvent might, if desired, be introduced directly into the space or compartment indicated at 89 between the first transverse weir 82 and the end plate 34 of the shell, the novel arrangement illustrated is of advantage in that it increases the efficiency of the extraction by removing from the solid material which has already reached the discharge drum head 45 an appreciable quantity of soluble matter which, while already extracted from the solid material, would otherwise be carried out of the apparatus with said material because of the lack of sufficient liquid solvent to wash the extracted matter back into the screened portion of the drum. When the solvent is introduced in the manner illustrated so as to wash through the solid material which is in the course of being discharged, the solvent and dissolved matter (miscella) which is being carried along with the mass of solid material will be washed out by the fresh solvent so that substantially no extracted soluble matter will leave the drum with the solids.

The solvent which overflows from the last or left-hand compartment 81 into the space 90 between the last transverse weir 82 and the end plate 34 of the shell is discharged from the extractor through a suitable outlet 91. This solvent, which normally contains a small amount of solid material as well as the desired, predetermined percentage of soluble matter, may first be passed through a suitable filter or other device for removing the solids, and then to a suitable recovery plant where the soluble matter and solvent may be separated and collected in known manner.

The means by which the solvent is transferred from the solvent compartments 81 at the bottom of the shell 32 to the interior of the drum 31 is best illustrated in Figs. 7-11. As there shown, there are secured to the exterior of the drum a plurality of solvent bucket units 92, one for each of the screen units 46, which are so constructed and arranged that, as the drum is rotated, they dip into the solvent contained in the compartments 81, elevate that solvent through approximately a quarter revolution of the drum and then pour the solvent onto the screened periphery of the drum, whereupon it flows through the screen and downwardly through the solid material within the drum, which is simultaneously being rolled or tumbled and gradually moved axially of the drum, picking up soluble matter as it flows, and finally drains back into the compartments 81 through the lower portion of the screened drum wall. Although the specific construction of the bucket units 92 may be varied as desired, that illustrated in the drawings has been found capable of delivering the solvent into the drum in a more desirable manner than other constructions which have been tried, and susceptible of both economical manufacture and ready connection to and disconnection from the drum.

As shown, each unit consists of an L-shaped base plate 93, a pair of side or wing plates 94 of generally triangular shape welded to the edges of the radially extending portion of the base plate at right angles to the latter, and a bucket forming element 95 of relatively complex shape which is welded both to the tangentially extending portion of the base plate 93 and to the side plates 94. The outer wall portion of each bucket forming element 95 is inwardly depressed as indicated at 96 so that, as the drum rotates, channels are available for reception of the alternate solvent compartment partitions or weirs 82 which lie intermediate the radial planes of the circumferential hoop members 42 (see Fig. 7). By riveting the depressed portion of the wall of the bucket forming element 95 to the base plate 93 in the manner indicated, each bucket unit is divided into two solvent containing spaces 97. To assist in retaining the desired amount of solvent in the spaces 97 when the bucket units are passed through the solvent compartments by rotation of the drum, the upper or free edges of the outer wall portion of the bucket forming element 95 may be hooded inwardly as indicated at 98. It will also be noted that the end wall portions of the bucket forming element 95 are longer than the tangentially extending portion of base plate 93 and underlap the side plates 94 in the manner shown best in Fig. 9. With this latter construction, it will be seen that, as each bucket unit is elevated beyond the horizontal position shown in Fig. 9, the solvent therein will flow out of the spaces 97 over the radially extending portion of base plate 93 in a stream which is confined and directionally controlled by the end wall portions of the element 95 and the side plates 94.

In order to provide for ready detachable mounting of the bucket units 92 on the drum, the axial dimension of each unit (that is, the distance between the two side plates 94) is made slightly less than the distance between the arcuate sides of the frame 65 of one of the screen units 46, and the side plates 94 and base plate 93 are provided with bolt holes 99 and 100, respectively, which are adapted to line up with the screen frame bolt holes 68 and 69, and to receive the bolts 72 and 73 by which the screen units are secured to the drum framework (see Fig. 6a).

All of the bucket units 92 are of identical construction except as respects the radial dimensions of the base plates 93 and side plates 94. Because of the fact that the solvent compartment weirs 82 decrease uniformly in height from one end of the drum to the other, it is obvious that the distance between the liquid level of the solvent in the compartments 81 and the axis of the drum will increase proportionately as the material feeding end of the latter is approached. Consequently, in order that the bucket units associated with the different sections of the drum may all receive the proper amount of solvent in passing through the compartments 81, it is desirable that the radial dimensions of the base and side plates of these units be suitably varied to compensate for the difference in solvent level in the various compartments. Although, with compartment weirs of uniformly varying height such as those illustrated, the bucket units in each section of the drum should theoretically be of a different radial dimension than those of the adjacent sections, satisfactory results and more economical manufacture may be obtained by using units of the same dimension in each pair of sections along the length of the drum, thereby requiring only five different sizes of base and side plates, instead of ten.

After the solid material being treated has been moved through the drum and simultaneously subjected to a vigorous agitation and washing with transversely flowing solvent in the manner previously described, it reaches the discharge head 45 of the drum and is there delivered by the lifting blades 63 into the previously mentioned discharge trough 64 which constitutes one element of the means by which the extracted material is removed from the apparatus. This trough, which is of the irregular shape illustrated in Figs. 24 and 25, is provided with a supporting flange 101 carrying a plurality of stud bolts 102 by which the trough is adapted to be fixed to the end plate 34 of the shell 32 in proper position to project inwardly through the central opening defined by the inwardly turned lip 59 of the drum discharge head 45. As is shown best in Fig. 8, the position of the flange 101 is off-set from the vertical axial plane of the drum, but the body portion of the trough is formed with a corresponding eccentricity in the opposite direction so as to bring the open mouth of the trough into proper position to receive the solid material as it slides off the lifting blades 63.

The stud bolts 102 also serve to secure to the outer surface of end plate 34, in coaxial alignment with the opening 103 in supporting flange 101, a discharge pipe 104 provided adjacent its outer end with a downwardly directed conduit 105 through which the extracted solid material may be delivered from the extractor to any desired destination, as, for example, to a solvent recovery device. In order to move the extracted material from the trough 64 through the pipe 104 to the conduit 105, a screw conveyor 106 is rotatably mounted in the trough and pipe, the inner end of the conveyor shaft 107 taking bearing in a suitable boss 108 carried by the body of the trough 64, while its outer end passes through a combined radial and thrust bearing 109 carried by the pipe 104 and thence to any suitable driving member (not shown), such as a variable speed motor like that indicated at 78 which drives the conveyor 77 at the feeding end of the extractor.

Inasmuch as the solid material which is delivered into the discharge trough 64 may still contain some solvent and dissolved soluble matter, it is desirable that this liquid be given an opportunity to drain back into the extractor before the solids are finally discharged from the apparatus. To this end, the bottom of the body portion of the trough 64 is provided with a plurality of milled slots 110 through which liquid may drain into the discharge drum head 45 or the space 89 in the bottom of the shell 32. For the same purpose, a substantial section of discharge pipe 104 is provided with similar slots 111 and a catch tank 112 into which said slots open. Any liquid draining into the catch tank 112 is returned to the end compartment 89 of the shell 32 through a suitable conduit 113.

While it may be feasible in many instances to omit the special solids discharge mechanism disclosed and to simply drop the solids from the lifting blades 63 of the discharge head 45 into a steep angle, gravity discharge chute and later recover whatever solvent may remain in the solids by a pressing or distilling operation, the use of the particular construction illustrated increases the magnitude of the solvent flow through the extractor and, as a consequence, the extraction efficiency also, particularly when the apparatus is used for extracting oils and fats from finely divided or flaked vegetable materials.

Although it is believed that the method aspects of the present invention will be obvious from the foregoing description of a preferred form of apparatus for carrying out the method, the procedure may be summarized as follows, applying it, by way of example, to the extraction of oil from corn germ.

The corn germ is first reduced to finely divided condition, as by flaking, crushing, grinding or other suitable mechanical operation, so as to free the oil from the natural cell structure of the corn. The finely divided corn is then placed in the hopper 75, whence it is fed by the helicoidal conveyor 77 through the pipe 76 and into the delivery spout 79 and chute 60 which deliver it to the interior of the feeding head 44 of the drum 31. As the drum is continuously rotated by the motor 57, the particles of corn are gradually moved through the drum by the semicircular helical vanes 80 with a combined axial and rolling or tumbling movement. At the same time, solvent, originally supplied in fresh state from the source 83 to the interior of the discharge head 45 of the drum by the solvent supply weir 85, is being continuously taken from the compartments 81 in the bottom of the extractor shell 32 by the bucket units 92, elevated therein and then dumped over the upper portion of the screened circumferential wall of the drum, whereupon it flows through the fine mesh working screen 67 (backwashing the screen as it passes therethrough), into the drum and through the mass of finely divided particles of corn until it reaches the bottom portion of the drum and drains back through the screened wall thereof into the compartments 81.

Due to the stepped arrangement of the transverse partitions or weirs 82 forming the solvent compartments 81, there is a gradual flow of solvent and dissolved oil from one compartment to the next in a direction countercurrent to that in which the corn moves through the drum, the result being that the oil concentration of the solution in the various compartments varies substantially uniformly from one end of the extractor to the other, being a minimum in the extreme right-hand compartment adjacent the discharge end of the drum and a maximum in the left-hand compartment and space 90 whence the concentrated solution is discharged to the oil and solvent separating and recovery system through the outlet 91. In this manner, the concentration of the solvent which is flowed through the corn at the various points along the length of the drum is varied in approximately direct relation to the oil content of the corn through which it flows.

For optimum results, the speed of operation of the feeding conveyor 77 is so regulated relatively to the speed of rotation of the drum 31 that the latter is maintained less than half full of corn, a 40% fill being preferred when handling this particular material. The flow of fresh solvent from the source 83 is also controlled in any suitable manner relatively to the feed of the corn so as to extract the desired proportion of oil from the corn during the interval of time which it takes for the passage of the corn through the drum.

When the corn reaches the discharge end of the drum, it moves into the discharge head 45 through the spaces between the spokes 54 of the end wheel 43, where it is subjected to a shower of fresh solvent dripping off the serrated bottom edge of the overflow wall of the solvent supply weir 85. The corn is then elevated by the lifting blades 63 and delivered thereby into the discharge trough 64, the perforations in said blades and the milled slots 110 in the bottom of said trough permitting drainage of solvent and dissolved oil back into the bottom of the discharge head 45, whence it may escape into the screened section at the end of the drum and thence drain into the solvent compartments 81 therebeneath. The extracted corn is moved outwardly from the trough 64 through the pipe 104 and into the discharge conduit 105 by the screw conveyor 106, the milled slots 111 in the bottom of the pipe permitting further drainage of liquid into the catch tank 112 from which it is returned to the space 89 at the end of the shell through the conduit 113. The relatively dry, extracted corn which is thus delivered into the discharge conduit 105 may be treated for further recovery of solvent, if desired, and then disposed of in any suitable manner.

There are thus provided by the present invention both an improved method and a novel apparatus for extracting soluble matter from solid materials containing the same which are capable of more rapid and efficient extraction than the procedures and mechanisms heretofore known. By combining the countercurrent principle of solvent extraction with a relatively vigorous agitation of the material and a transverse flow of the solvent relatively to the movement of said material through the treating zone in the manner disclosed, it has been found that substantially complete extraction of any given material can be accomplished in from 10% to 25% of the time required when using ordinary counterflow methods and apparatus. Consequently, an installation embodying the present invention is capable of extracting the same amount of raw material per unit of time as could be handled by a machine of from four to ten times its size constructed and operated according to the teachings of the prior art.

In extracting oil from the insides of fibrous particles such as finely divided vegetable matter, the rolling or tumbling movement imparted to the particles according to the present invention produces a sponge-like squeezing action, while the substantially continuous transverse flow of solvent insures that there is always solvent available for picking up any oil that may come to the exposed surfaces of the particles, dissolving it and carrying it away out of the drum. The constant backwashing of the screen by the solvent as the latter is poured from the buckets onto the exterior of the drum is also of substantial advantage because it prevents the screen from becoming clogged with the finely divided material being extracted, and thereby avoids the lost time that would occur were it necessary to periodically take the machine out of service for the purpose of cleaning the screen.

Structurally, the apparatus of the present invention is not only novel, but also particularly well adapted for continuous operation with a minimum of attention by the operating force. It is also of such construction as to facilitate manufacture, since the principal elements of the drum, shell and material feeding and discharge means are separately formed and assembled in such a way as to be readily removable and replaceable without dismantling of the machine.

These and other advantages of the procedure and apparatus herein disclosed characterize the present invention as a marked improvement over the extraction methods and devices of the prior art. In this connection, although only one specific mechanism for carrying out the invention has been illustrated in the accompanying drawings, it should be obvious that the invention is not limited to the particular structure shown, but is capable of a variety of mechanical embodiments. For example, instead of using the bucket and compartment arrangement disclosed, various other expedients could be readily devised for delivering solvent into the drum at various points along the length thereof and causing said solvent to flow through the material in the drum in a generally radial direction. Similarly, the movement of the particles of solid material through the drum could be produced in ways other than by the use of a helical conveyor like that illustrated; in some instances, the mere pressure of the feed of the material into the drum would be sufficient. The gradual countercurrent flow of the solvent might also be effected by other means than the stepped compartment partitions or weirs shown, as by the provision of cut-outs or flow orifices in said partitions of suitable size or shape, as heretofore mentioned. Furthermore, certain of the elements of the apparatus are obviously useful independently of the others and in combination with various other devices adapted for similar purposes.

Inasmuch as numerous other changes, which will now suggest themselves to those skilled in the art, may also be made in the procedural steps of the method, and in the form, details of construction and arrangement of the parts of the apparatus, without departing from the spirit of the invention, the limits of the invention are to be measured only by the appended claims.

What is claimed is:

1. In a method of extracting soluble matter from particles of solid material, the steps of moving said material in one direction through a solvent treating zone, flowing a body of solvent in the opposite direction below and out of contact with said zone, lifting portions of said solvent body above said zone at a plurality of points along its length, and percolating the lifted portions of solvent down through said material, said percolating solvent draining from the material in said zone back into the body of solvent below.

2. In a method of extracting soluble matter from particles of solid material, the steps of moving a continuous mass of said material in one direction through a solvent treating zone, flowing a body of solvent in the opposite direction below and out of contact with said zone, lifting portions of said solvent body above said zone at a plurality of points along its length, and percolating the lifted portions of solvent down through said material, said percolating solvent draining from the material in said zone back into the body of solvent below.

3. In a method of extracting soluble matter from particles of solid material, the steps of moving a continuous mass of said material in one direction through a solvent treating zone, while simultaneously rolling or tumbling said material, flowing a body of solvent in the opposite direction below and out of contact with said zone, lifting portions of said solvent body above said zone at a plurality of points along its length, and percolating the lifted portions of solvent down through said material, said percolating solvent draining from the material in said zone back into the body of solvent below.

4. In a method of extracting soluble matter from particles of solid material, the steps of moving said material in one direction through a solvent treating zone, flowing solvent in the opposite direction below and out of contact with said zone through a plurality of substantially separate but communicating stages, lifting portions of said solvent above said zone from each of said stages, and percolating said lifted solvent down through said material, said percolating solvent draining from the material in said zone back into the stage from which it was lifted.

5. In a method of extracting soluble matter from particles of solid material, the steps of moving said material in one direction through a solvent treating zone, while simultaneously rolling or tumbling said material, flowing solvent in the opposite direction below and out of contact with said zone through a plurality of substantially separate but communicating stages, lifting portions of said solvent above said zone from each of said stages, and percolating said lifted solvent down through said material, said percolating solvent draining from the material in said zone back into the stage from which it was lifted.

6. In a method of extracting soluble matter from particles of solid material, the steps of moving said material in one direction through a solvent treating zone, while simultaneously rolling or tumbling said material, flowing solvent in the opposite direction below and out of contact with said zone by overflow to stages of successively decreasing level, lifting portions of said solvent above said zone from each of said stages, and percolating said lifted solvent down through said material, said percolating solvent draining from the material in said zone back into the stage from which it was lifted.

7. Apparatus for extracting soluble matter from particles of solid material comprising a rotatable, cylindrical drum having a perforated wall, means for feeding said material through said drum in one direction, a plurality of solvent compartments having solvent levels below and out of contact with said drum, means for feeding solvent from one compartment to another in succession in the opposite direction, and means carried by said drum for lifting solvent from said compartments and emptying it on the top of the drum to percolate through said material therein and drain from the bottom of the drum back into said compartments.

8. Apparatus for extracting soluble matter from particles of solid material comprising a rotatable, cylindrical drum having a perforated wall, means for feeding said material through said drum in one direction, a plurality of solvent compartments having solvent levels below and out of contact with said drum and successively decreasing in height in the opposite direction, means for feeding solvent to a high compartment whereby it overflows from one compartment to another in said opposite direction, and means carried by said drum for lifting solvent from said compartments and emptying it on the top of the drum to percolate through the material therein and drain from the bottom of the drum back into said compartments.

9. Apparatus for extracting soluble matter from particles of solid material comprising a rotatable, cylindrical drum having a perforated wall, feeding elements within said drum for feeding said material therethrough in one direction, a plurality of solvent compartments having solvent levels below and out of contact with said drum, means for feeding solvent from one compartment to another in succession in the opposite direction, and means for lifting solvent from each compartment and emptying it on top of the drum to percolate through the material therein and drain back into said compartments.

THOMAS M. RECTOR.